US009109907B2

(12) United States Patent
Park et al.

(10) Patent No.: US 9,109,907 B2
(45) Date of Patent: Aug. 18, 2015

(54) VEHICLE POSITION RECOGNITION APPARATUS AND METHOD USING IMAGE RECOGNITION INFORMATION

(75) Inventors: Kwang Il Park, Seoul (KR); Sang Mook Lim, Seoul (KR); Jin Hyuck Kim, Seoul (KR)

(73) Assignee: PLK TECHNOLOGIES CO., LTD., Seoul (KR)

( * ) Notice: Subject to any disclaimer, the term of this patent is extended or adjusted under 35 U.S.C. 154(b) by 0 days.

(21) Appl. No.: 13/984,553

(22) PCT Filed: Sep. 6, 2012

(86) PCT No.: PCT/KR2012/007155
§ 371 (c)(1),
(2), (4) Date: Aug. 9, 2013

(87) PCT Pub. No.: WO2014/017693
PCT Pub. Date: Jan. 30, 2014

(65) Prior Publication Data
US 2014/0032100 A1    Jan. 30, 2014

(30) Foreign Application Priority Data

Jul. 24, 2012   (KR) .................. 10-2012-0080465

(51) Int. Cl.
*G01C 21/30*  (2006.01)
*G05D 1/02*   (2006.01)
*G06K 9/00*   (2006.01)
*G01C 21/00*  (2006.01)

(52) U.S. Cl.
CPC ............. *G01C 21/30* (2013.01); *G01C 21/005* (2013.01); *G05D 1/0246* (2013.01); *G06K 9/00791* (2013.01); *G06K 9/00798* (2013.01); *B60W 2420/42* (2013.01)

(58) Field of Classification Search
None
See application file for complete search history.

(56) References Cited

U.S. PATENT DOCUMENTS

| 6,032,098 | A  | * | 2/2000  | Takahashi et al. ............... 701/23 |
| 6,061,627 | A  | * | 5/2000  | Sato .............................. 701/495 |
| 7,742,872 | B2 |   | 6/2010  | Kimura et al. |
| 8,204,685 | B2 |   | 6/2012  | Kang et al. |
| 2002/0134151 | A1 | * | 9/2002 | Naruoka et al. ................. 73/291 |
| 2003/0072471 | A1 | * | 4/2003 | Otsuka et al. ................. 382/103 |
| 2006/0031008 | A1 | * | 2/2006 | Kimura et al. ................ 701/208 |

(Continued)

FOREIGN PATENT DOCUMENTS

| JP | 2006-023278 A | 1/2006 |
| JP | 2008-276642 A | 11/2008 |

(Continued)

*Primary Examiner* — Rami Khatib
*Assistant Examiner* — Jeffrey Boomer
(74) *Attorney, Agent, or Firm* — Rabin & Berdo P.C.

(57) ABSTRACT

Provided is a GPS correction system and method which corrects position information obtained from a low-precision GPS device using image recognition information. The GPS correction system using image recognition system includes: a GPS module; an image recognition device having a line recognition function; a road map storage unit configured to store road map information including line characteristic information or a road map receiving unit configured to receive the road map information; and an information processing device configured to compare the line recognition information acquired through the image recognition device to the line characteristic information, correct a current position measured by the GPS module, and calculate traveling lane information.

9 Claims, 7 Drawing Sheets

(56) References Cited

U.S. PATENT DOCUMENTS

| | | | |
|---|---|---|---|
| 2006/0047388 A1* | 3/2006 | Oka et al. | 701/41 |
| 2006/0233424 A1* | 10/2006 | Miyajima et al. | 382/104 |
| 2009/0118994 A1* | 5/2009 | Mori et al. | 701/117 |
| 2011/0169958 A1* | 7/2011 | Imai et al. | 348/149 |
| 2011/0320121 A1 | 12/2011 | Kang et al. | |

FOREIGN PATENT DOCUMENTS

| | | |
|---|---|---|
| KR | 10-2009-0064946 A | 6/2009 |
| KR | 10-1010678 B1 | 1/2011 |

* cited by examiner

| LINE CHARACTERISTIC INFORMATION | | FIRST LANE | | SECOND LANE | | THIRD LANE | | FOURTH LANE | | FIFTH LANE | |
|---|---|---|---|---|---|---|---|---|---|---|---|
| LINE NUMBER | | 0 | | 1 | | 2 | | 3 | | 4 | 5 |
| D O U B L E | L I N E | | | | | | | | | | |
| | 1 | YELLOW | SOLID LINE | BLUE | SOLID LINE | WHITE | DOTTED LINE | WHITE | DOTTED LINE | WHITE DOTTED LINE | WHITE SOLID LINE |
| | 2 | YELLOW | SOLID LINE | BLUE | SOLID LINE | – | – | – | – | – – | – – |
| | 3 | – | – | – | – | – | – | – | – | – – | – – |

LINE RECOGNITION
INFORMATION

| LINE NUMBER | | 0 | | 1 | |
|---|---|---|---|---|---|
| DOUBLE LINE | 1 | BLUE | SOLID LINE | WHITE | DOTTED LINE |
| | 2 | BLUE | SOLID LINE | – | – |
| | 3 | – | – | – | – |

FIG. 4

LINE RECOGNITION
INFORMATION

| LINE NUMBER | | 0 | | 1 | |
|---|---|---|---|---|---|
| DOUBLE LINE | 1 | BLUE | SOLID LINE | WHITE | DOTTED LINE |
| | 2 | BLUE | SOLID LINE | – | – |
| | 3 | – | – | – | – |

Exact match    Exact match

LINE CHARACTERISTIC
INFORMATION

| LINE NUMBER | | 0 | | 1 | | 2 | | 3 | | 4 | | 5 | |
|---|---|---|---|---|---|---|---|---|---|---|---|---|---|
| DOUBLE LINE | 1 | YELLOW | SOLID LINE | BLUE | SOLID LINE | WHITE | DOTTED LINE | WHITE | DOTTED LINE | WHITE | DOTTED LINE | WHITE | SOLID LINE |
| | 2 | YELLOW | SOLID LINE | BLUE | SOLID LINE | – | – | – | – | – | – | – | – |
| | 3 | – | – | – | – | – | – | – | – | – | – | – | – |

LINE RECOGNITION
INFORMATION

| LINE NUMBER | | 0 | | 1 | |
|---|---|---|---|---|---|
| DOUBLE LINE | 1 | WHITE | DOTTED LINE | WHITE | DOTTED LINE |
| | 2 | – | – | – | – |
| | 3 | – | – | – | – |

| LINE NUMBER | | 0 | | 1 | |
|---|---|---|---|---|---|
| DOUBLE LINE | 1 | WHITE | DOTTED LINE | WHITE | DOTTED LINE |
| | 2 | – | – | – | – |
| | 3 | – | – | – | – |

LINE CHARACTERISTIC
INFORMATION

| LINE NUMBER | | 0 | | 1 | | 2 | | 3 | | 4 | | 5 | |
|---|---|---|---|---|---|---|---|---|---|---|---|---|---|
| DOUBLE LINE | 1 | YELLOW | SOLID LINE | BLUE | SOLID LINE | WHITE | DOTTED LINE | WHITE | DOTTED LINE | WHITE | DOTTED LINE | WHITE | SOLID LINE |
| | 2 | YELLOW | SOLID LINE | BLUE | SOLID LINE | – | – | – | – | – | – | – | – |
| | 3 | – | – | – | – | – | – | – | – | – | – | – | – |

FIG. 8

| LINE NUMBER | | 0 | | 1 | | 2 | | 3 | | 4 | | 5 | |
|---|---|---|---|---|---|---|---|---|---|---|---|---|---|
| WIDTH | | | | 3.5m | | 2.5m | | 2.7m | | 3.3m | | 2.8m | |
| D O U B L E | L I N E | 1 | YELLOW | SOLID LINE | BLUE | SOLID LINE | WHITE | DOTTED LINE | WHITE | DOTTED LINE | WHITE | DOTTED LINE | WHITE | SOLID LINE |
| | | 2 | YELLOW | SOLID LINE | BLUE | SOLID LINE | – | – | – | – | – | – | – | – |
| | | 3 | – | – | – | – | – | – | – | – | – | – | – | – |

(Column headers above: FIRST LANE, SECOND LANE, THIRD LANE, FOURTH LANE, FIFTH LANE)

VEHICLE POSITION RECOGNITION APPARATUS AND METHOD USING IMAGE RECOGNITION INFORMATION

STATEMENT REGARDING SPONSORED RESEARCH

This invention was made with Korean government support under Technology Innovation Projects (Grant No. 10110-13-1002) awarded by Ministry of Trade, Industry & Energy, Ministry of Science, ICT and Future Planning, and National IT Industry Promotion Agency. The Korean governments have certain rights in the invention.

TECHNICAL FIELD

The present invention relates to a global positioning system (GPS) correction system and method using image recognition information, which is capable of implementing high-precision GPS performance such as a differential GPS (DGPS) device through a low-precision GPS device, thereby promoting the introduction of autonomous navigation system.

BACKGROUND

Recently, much research has been conducted on autonomous navigation of a vehicle. Typically, autonomous navigation means that an ECU mounted in a vehicle controls the vehicle to travel from a specific start point to an end point on a road according to predetermined logic, using GPS position information and various sensors based on road map information.

The autonomous navigation must be able to be applied to arbitrary roads including a crossroad, a forked road, and a tunnel as well as a straight road. Thus, the ECU must accurately recognize a traveling lane on a road. For example, when a vehicle is to make a left turn on a crossroad, a lane through which the vehicle can make a left turn is fixed on the crossroad. Thus, when the vehicle departs from the fixed lane, an accident may occur.

In general, conventional GPS devices have a positional deviation of 20 to 30 m. Thus, the conventional GPS devices cannot precisely recognize a traveling lane. However, a recently-developed differential GPS (DGPS) device has a positional deviation of about 1 m. Since general roads have a width of 3 to 5 m, traveling lane information recognized through the DGPS device may enable autonomous navigation.

However, the DGPS device is very expensive. Thus, when the DGPS device is mounted in a vehicle, the price of the vehicle rapidly increases. That is, there is a fundamental limit in mounting an autonomous navigation system using the DGPS device on a vehicle.

DISCLOSURE

Technical Problem

An embodiment of the present invention is directed to a GPS correction system and method using image recognition information, which is capable of extracting position information having high precision similar to that of a high-precision DGPS device, while using a low-precision GPS device, thereby promoting the introduction of traveling lane recognition technology for autonomous navigation of an autonomous vehicle.

Technical Solution

According to an embodiment of the present invention, a GPS correction system using image recognition system includes: a GPS module; an image recognition device having a line recognition function; a road map storage unit configured to store road map information including line characteristic information or a road map receiving unit configured to receive the road map information; and an information processing device configured to compare the line recognition information acquired through the image recognition device to the line characteristic information, correct a current position measured by the GPS module, and calculate traveling lane information.

The information processing device may include: an information matching unit configured to match the line recognition information to the line characteristic information and calculate a traveling lane; and a lane change tracing unit configured to calculate the traveling lane by tracing a lane change record of a vehicle in a state where the traveling lane cannot be calculated by the information matching unit.

The information processing device may further include a lateral position correction unit configured to calculate an offset for a left line of the current traveling lane from the image recognition information and correct a lateral position.

The lateral position correction unit may add the offset and the sum of widths of left lines, included in the line characteristic information, in order to correct the lateral position.

The information processing device may further include a longitudinal position estimation unit configured to calculate a head angle between a line and a traveling direction of the vehicle from the image recognition information and estimate a longitudinal position, when a signal received by the GPS module is cut.

The longitudinal position estimation unit estimates the longitudinal position through the following equation: $LP = \Delta t \times v \times \cos \theta$ where LP represents a longitudinal position of the vehicle, $\Delta t$ represents a time variation, v represents a velocity of the vehicle, and $\theta$ represents the head angle between the line and the traveling direction of the vehicle.

According to another embodiment of the present invention, a GPS correction method using image recognition information includes the steps of: (a) matching line recognition information acquired through an image recognition device to line characteristic information of road map information and calculating a traveling lane; (b) correcting the traveling lane by tracing a lane change record of a vehicle, when the traveling lane is not specified at the step (b); (c) correcting a lateral position by calculating an offset for a left line of the current traveling lane from the image recognition information of the image recognition device; and (d) estimating a longitudinal position by calculating a head angle between a line and a traveling direction of the vehicle from the image recognition information, when a signal received by a GPS module is cut.

The step (c) may include correcting the lateral position by adding the offset and the sum of widths of left lanes included in the line characteristic information.

The step (d) may include estimating the longitudinal position through the following equation: $LP = \Delta t \times v \times \cos \theta$ where LP represents a longitudinal position of the vehicle, $\Delta t$ represents a time variation, v represents a velocity of the vehicle, and $\theta$ represents the head angle between the line and the traveling direction of the vehicle.

Advantageous Effects

According to the embodiments of the present invention, the line recognition information acquired through the image recognition device and the stored or received line characteristic information may be matched to accurately calculate a traveling lane. Thus, position information acquired from a low-price GPS device may be precisely corrected, high-precision position information suitable for autonomous navigation may be acquired without using a high-price DGPS device, and the function of navigation devices may be improved.

Furthermore, position information of a vehicle may be corrected with high precision through the steps of tracing a line change record, correcting a lateral position, and estimating a longitudinal position, and the relative position of the vehicle for a line on the road map may be traced in a section such as a tunnel in which a GPS signal is cut, without using an inertia sensor.

BRIEF DESCRIPTION OF THE DRAWINGS

FIG. 4 is a line recognition information table according to the embodiment of the present invention.

FIGS. 5 to 8 illustrate examples in which a traveling lane is calculated according to the embodiment of the present invention.

BEST MODE FOR THE INVENTION

Figure 1:
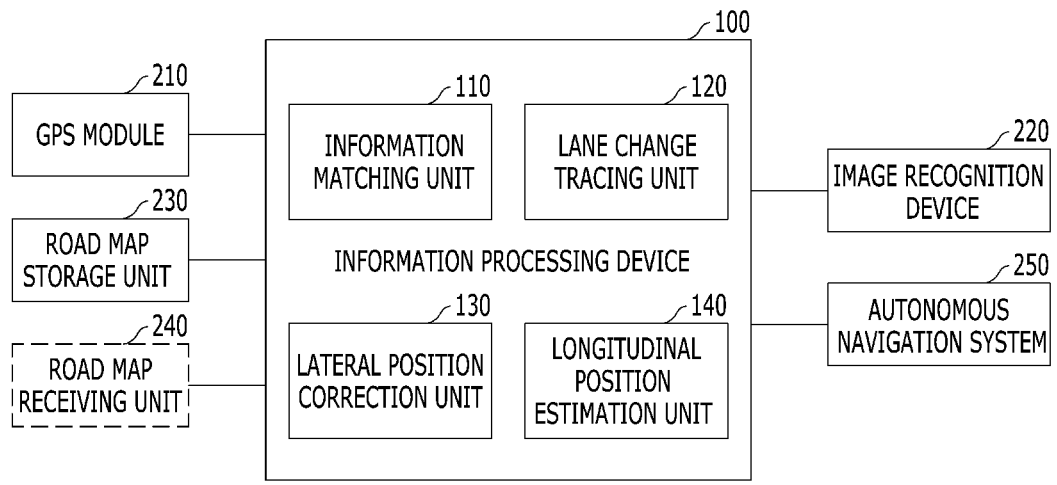
FIG. 1 is a block diagram illustrating a GPS correction system according to an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Throughout the disclosure, like reference numerals refer to like parts throughout the various figures and embodiments of the present invention. The drawings attached to the disclosure are provided for convenience of description, and the shapes and relative scales thereof may be exaggerated or omitted.

When the exemplary embodiments are described in detail, duplicated descriptions or descriptions of techniques obvious to those skilled in the art will be omitted. Furthermore, when it is described that one element comprises (or includes or has) some elements, it should be understood that it may comprise (or include or has) only those elements, or it may comprise (or include or have) other elements as well as those elements if there is no specific limitation.

Furthermore, a term such as "~ unit", "~er", or "~module" in the disclosure indicates a unit for processing one or more functions or operations, and may be implemented with hardware, software, or a combination of hardware and software. Furthermore, when one element is referred to as being electrically connected to another element, it should be understood that the former can be directly connected to the latter or electrically connected to the latter via an intervening element.

FIG. 1 is a block diagram illustrating a GPS correction system according to an embodiment of the present invention. Referring to FIG. 1, the GPS correction system using image recognition information according to the embodiment of the present invention includes a GPS module 210 mounted in a vehicle and an information processing device 100 configured to communicate with an image recognition device 220 and process current traveling lane information of a vehicle. The GPS correction system may further include a road map storage unit 230 configured to store road map information including line characteristic information and a road map receiving unit 240 configured to receive the road map information. The road map storage unit 230 and the road map receiving unit 240 may be provided as one unit.

FIG. 1 illustrates that the information processing device 100 and the mage recognition device 220 are separated from each other. However, the two devices do not need to be physically separated from each other. For example, the information processing device 100 may be included in the image recognition device 200 inside a navigation device, or both of the image recognition device 220 and the information processing device 100 may be provided inside the autonomous navigation system 250. The two devices may be configured as one processor, but may be separated only in terms of software or may have different execution routines from each other. That is, the information processing device 100, the image recognition device 200 and the other components are divided only in terms of functionality, but may be implemented on the same hardware.

The GPS module 210 does not require high precision. The information processing device 100 according to the embodiment of the present invention corrects position information acquired through the GPS module 210 provided at a low price, using image recognition information, thereby converting the position information into information with high precision. The information processing device 100 processes traveling lane information and transmits high-precision position information to the autonomous navigation system 250. In the present embodiment, the communication between the devices is performed through car area network (CAN). The communication network is only an example, and the communication may be performed through a radio signal or other known communication schemes.

The information processing device 100 includes one or more processors. Referring to FIG. 1, the information processing device 100 includes an information matching unit 110, a lane change tracing unit 120, a lateral position correction unit 130, and a longitudinal position estimation unit 140. Each of the units may be configured as an independent processor inside the information processing device 100 or may constitute a programmed sub routine inside one processor. Furthermore, a part of the components may be selectively used.

Hereafter, the GPS correction system and method using image recognition information according to the embodiment of the present invention will be described in detail by referring to embodiments of the respective units of the information processing device 100.

Figure 2A:
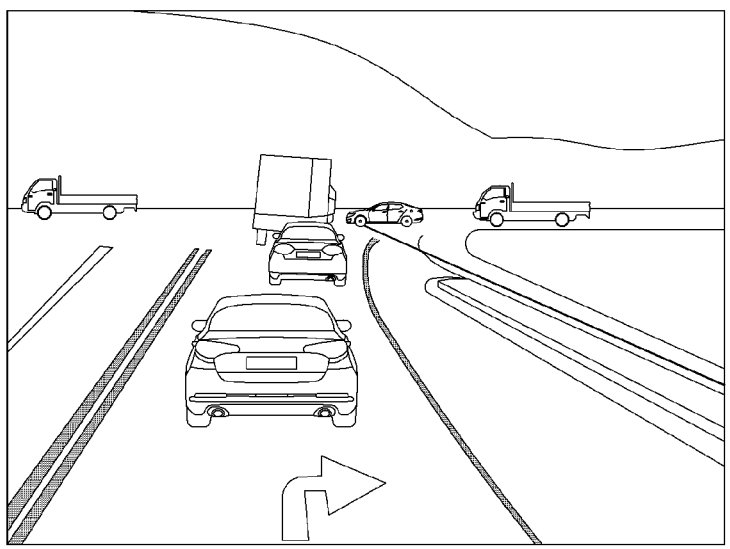
FIGS. 2A and 2B are photographs taken by an image recognition module.
Figures 2B, 3:
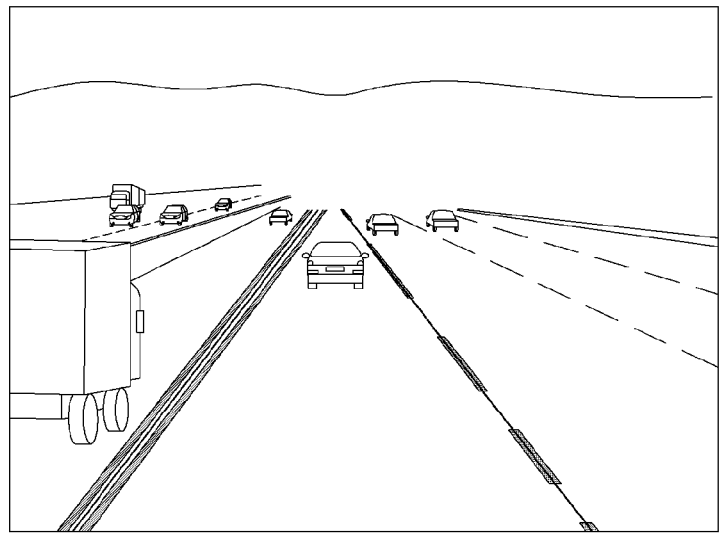
FIG. 3 is a line characteristic information table according to the embodiment of the present invention.

FIGS. 2A and 2B are photographs taken by a camera mounted on a vehicle while the vehicle travels. FIG. 2A is a photograph showing a first lane of a national highway, and FIG. 2B is a photograph of a second lane of an expressway. In FIG. 2A, a left line of the traveling lane of the vehicle is a yellow double solid line indicating a centerline, and a right line of the traveling lane is a white solid line. In FIG. 2B, a left line of the traveling lane of the vehicle is a blue double solid line indicating a bus-dedicated lane, and a right line of the traveling lane is a white dotted line. Such lines represent various pieces of information depending on the positions of lanes.

However, when a plurality of lines are drawn on a road, most of the lines are represented by white dotted lines. In some cases, the bus-dedicated lane may not be positioned in a left first lane, but positioned in a right first lane. Thus, the image recognition device 220 cannot accurately recognize a traveling lane only by analyzing an image taken through the camera.

According to the embodiment of the present invention, the information processing device 100 basically matches the line recognition information acquired through the image recognition device 220 to the road map information, and calculates a traveling lane. For example, the road map information is stored in the road map storage unit 230. For another example, the road map receiving unit 240 may communicate with an external device so as to receive the road map information.

The road map information may include road map information provided from a navigation device, for example. Furthermore, the road map information may include dedicated road map information provided for GPS correction. The road map information includes line characteristic information as illustrated in FIG. 3. The line characteristic information indicates information on a line corresponding to a current position measured by the GPS module 210. Referring to FIG. 3, the line characteristic information includes whether or not a line is a double line, the color of the line, and the shape of the line (solid line or dotted line).

In the line characteristic information of FIG. 3, a line number '0' indicates a centerline, and is a yellow double solid line. A first line is a blue double solid line, and indicates a bus-dedicated lane. A first lane is formed between the centerline and the first line. Second to fourth lines are white dotted lines, and a fifth line is a white solid line.

When supposing that the image recognition device 220 recognizes only both lines of one lane, it is possible to acquire line recognition information as illustrated in FIG. 4. In FIG. 4, a line number '0' indicates a left line, and a line number '1' indicates a right line. In FIG. 4, the left line is a blue double solid line, and the right line is a white dotted line.

FIG. 5 illustrates that the information matching unit 110 of the information processing device 100 matches line recognition information acquired through the image recognition device 220 to the line characteristic information. As illustrated in FIG. 5, line numbers 0 and 1 of the line recognition information are exactly or uniquely matched to the line numbers 1 and 2 of the line characteristic information. Thus, the information matching unit 110 may determine that the current traveling lane is a second lane. In general, the GPS module 210 with low precision cannot accurately recognize a traveling lane. However, through the information matching operation, it is possible to accurately recognize the current traveling lane of the vehicle.

Figures 6, 7:
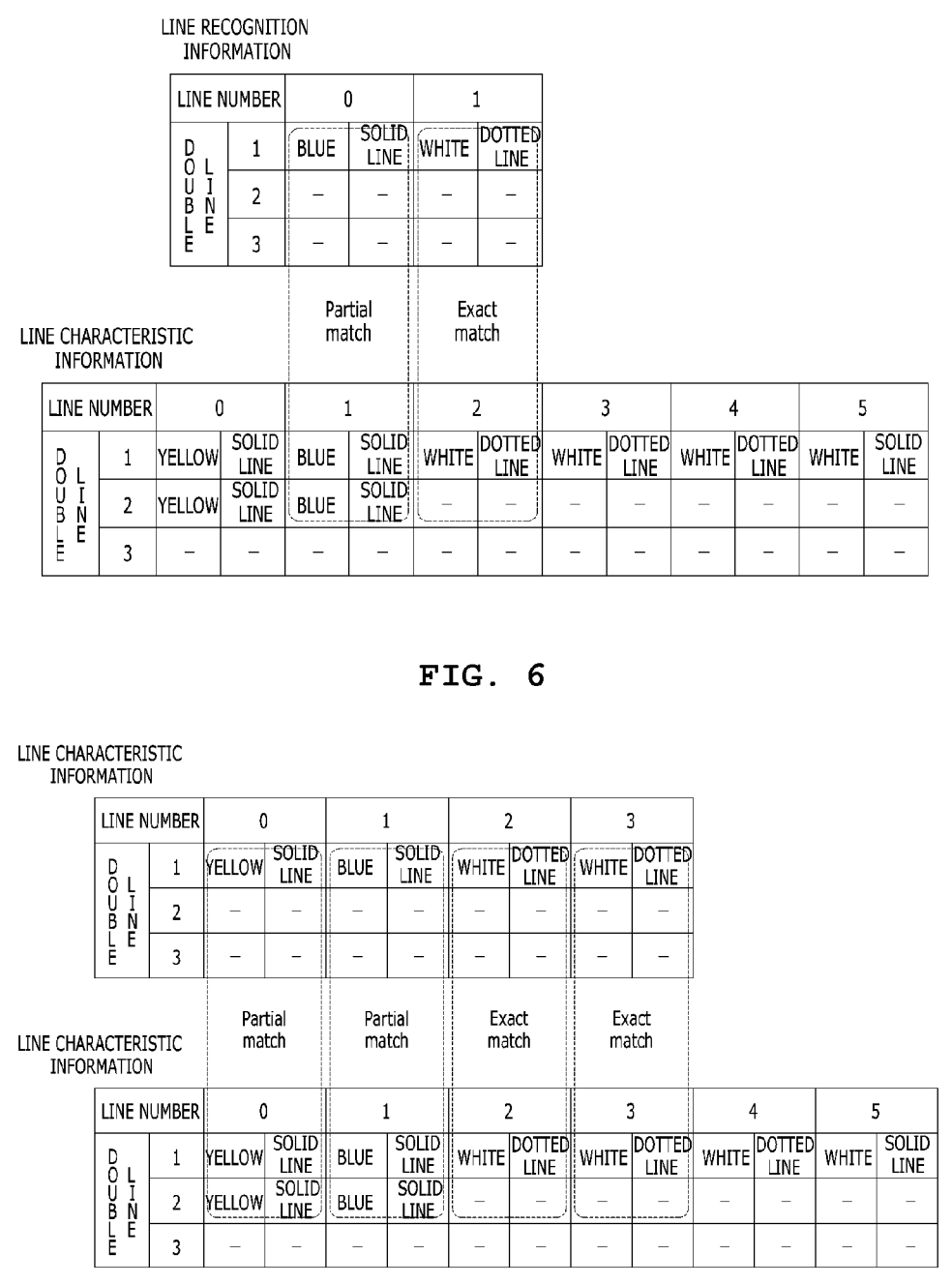

FIG. 6 illustrates that the information process device 100 may calculate a traveling lane even when the line recognition information and the line characteristic information partially match with each other. For example, depending on the line information acquired through the image recognition device 220, a double line may be recognized as a single line. In this case, a left line may be recognized as a blue single solid line, and a right line may be recognized as a white dotted line.

The information matching unit 110 performs information matching as illustrated in FIG. 6. The left line partially matches with the first line of the line characteristic information, but the right line exactly matches with the second line of the line characteristic information. At this time, it can be seen that the left and right lines of the line recognition information do not match with the other lines. That is, the line recognition information is uniquely matched to the line characteristic information, when the left line is the first line and the right line is the second line. In this case, the information matching unit 110 may determine that the current traveling lane is the second lane.

FIG. 7 illustrates another example in which line recognition information and line characteristic information partially match with each other. As illustrated in FIG. 7, the line recognition information may include information on four lines. For example, the image recognition device 220 not only may recognize both lines of a current traveling lane, but also may recognize other lines around the traveling lane. Furthermore, as illustrated in FIG. 6, a state in which a double line is not accurately recognized may occur.

The information matching unit 110 performs information matching as illustrated in FIG. 7. As illustrated in FIG. 7, partial matches and exact matches occur at the same time. However, the information on four lines in the line recognition information is uniquely matched to the line characteristic information from the centerline to the third line. Even in this case, the information matching unit 110 may accurately calculate the current traveling lane by matching the line recognition information to the line characteristic information.

As illustrated in FIG. 8, however, however, line recognition information may exactly match with the line characteristic information, but may not uniquely match with the line characteristic information. For example, both of left and right lines of the line recognition information may correspond to white dotted lines. In this case, the line recognition information exactly matches with information on the second and third lines or third and fourth lines of the line characteristic information. Thus, the position of the traveling lane cannot be accurately calculated only through the information matching unit 110.

The lane change tracing unit 120 of FIG. 1 traces the latest information matching result. For example, when the latest information matching result corresponds to a state in which the traveling lane is determined to be the second lane, the lane change tracing unit 120 checks a lane change record. Since the lane change record may be checked by the image recognition device 220, the lane change tracing unit 120 may trace the traveling lane by substituting a lane change time.

For example, suppose that a lane change was recorded one time and the traveling lane was determined to be the second lane according to the latest information matching result in a state where the information matching result as illustrated in FIG. 8 was obtained. In this case, the current traveling lane of the vehicle may be determined to be the third lane. For another example, when the traveling lane is changed to a right lane in a state where the traveling lane was determined to be the second lane according to the latest information matching result, the traveling lane may be traced and calculated by adding one to the number of traveling lane, and when the traveling lane is changed to a left lane, the traveling lane may be traced and calculated by subtracting one from the number of the traveling lane, until the next traveling lane is determined.

As described above, when the GPS information is corrected through the information matching unit 110 and the lane change tracing unit 120, the current position of the vehicle may be estimated within the traveling lane. Since typical roads have a width of about 3 m, precise position estimation with a small error may be realized.

Furthermore, the route change determination system and method according to the embodiment of the present invention may calculate more precise position information using the lateral position correction unit 130 and the longitudinal position correction unit 140 of FIG. 1.

Figures 9, 10:
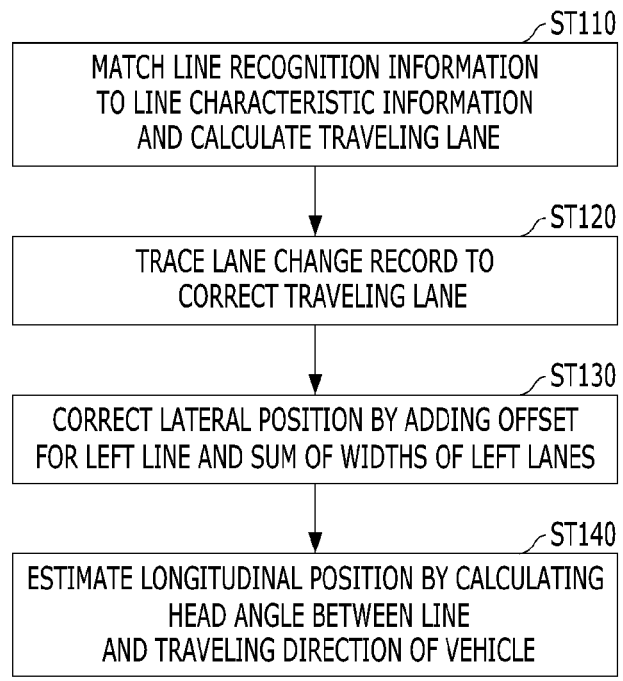
FIG. 9 is a flowchart illustrating GPS correction according to the embodiment of the present invention.
FIG. 10 is a lane width information table according to the embodiment of the present invention.

FIG. 9 is a flowchart illustrating GPS correction according to the embodiment of the present invention. Referring to FIG. 9, the information processing module 100 matches line recognition information acquired through the image recognition device 220 to line characteristic information of road map information and calculates a traveling lane at step ST110. A variety of examples in which the information matching unit 110 calculates a traveling lane have been already described above.

When the traveling lane is not specified at step ST110, the lane change tracing unit 120 traces a lane change record of the vehicle and corrects the traveling lane at step ST120. The example in which the lane change tracing unit 120 corrects the traveling lane has been already described with reference to FIG. 8.

In order to obtain more precise position information, an offset for a left line of the traveling lane is calculated to correct a lateral position at step S130. As illustrated in FIG. 10, the line characteristic information includes width information of each lane. When the traveling lane is determined to be a second lane at the step ST110 or ST120, a width from the centerline to the left line of the traveling lane may be calculated from the sum of widths of the first and second lanes. In FIG. 10, the sum of widths to the left line corresponds to 6 m.

A distance between the left line and the vehicle may be acquired through the image recognition device 220. Typically, a specific point on a road is projected into one point of an image through a camera conversion formula. The camera conversion formula is set through a coordinate conversion model of a camera, a correction model, a focal distance of a lens, an installation height of the camera, and an installation angle of the camera. When the camera conversion formula is used at a line recognized at an image, an offset between the line and the vehicle may be calculated.

Equations 1 and 2 show an example of the simplified camera conversion formula.

$$x = -\lambda \frac{X}{Z\cos\Phi + h\sin\Phi}\left(-\lambda\frac{X}{Z + h\Phi}\right) \quad \text{[Equation 1]}$$

$$y = -\lambda \frac{Z\cos\Phi + h\sin\Phi}{Z\cos\Phi + h\sin\Phi}\left(-\lambda\frac{Z\Phi - h}{Z + h\Phi}\right) \quad \text{[Equation 2]}$$

Here, x and y represent coordinate values on a screen, X and Z represent coordinate values on a road, $\lambda$ represents a focal distance of a lens, $\Phi$ represents a camera installation angle, and h represents a camera installation height.

Figure 11:
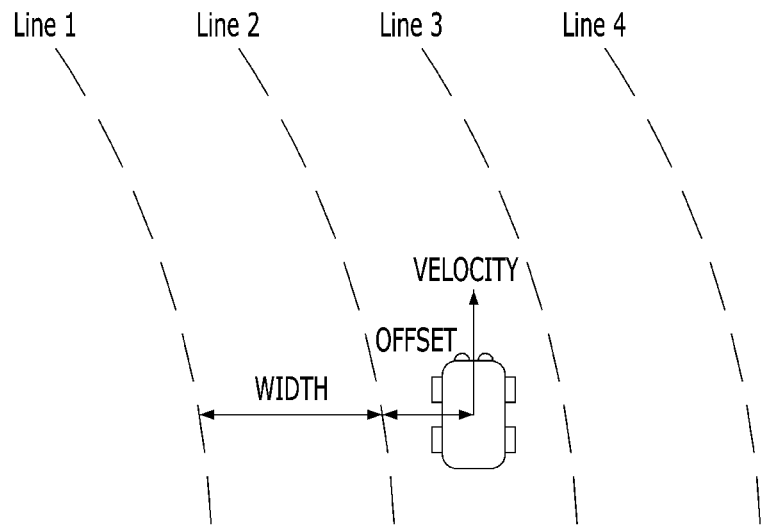
FIG. 11 is a diagram illustrating an example in which a lateral position is corrected according to the embodiment of the present invention.
Figure 12:
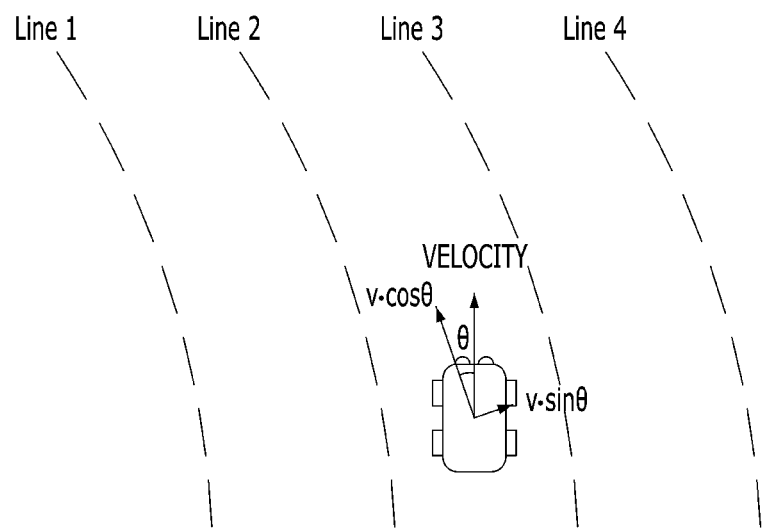
FIG. 12 is a diagram illustrating an example in which a longitudinal position is corrected according to the embodiment of the present invention.

Referring to FIG. 11, the lateral position correction unit 130 adds the sum of widths of the left lane of the current traveling lane and the offset obtained through the above equations and corrects the lateral position, thereby obtaining a high-precision lateral position having an error much smaller than simple traveling lane information. As the offset of the traveling lane is used to correct the lateral position, the error decreases to several tens of cm.

Referring to FIG. 9, a head angle formed between the line and the traveling direction of the vehicle is calculated to estimate a longitudinal position at step ST140. The longitudinal position refers to a displacement on the road map in the line direction. In autonomous navigation or navigation guide, autonomous navigation control or geographic guide is conducted according to the longitudinal position. The longitudinal position needs to be estimated in a place such as a tunnel, where the reception of the GPS module 110 is cut.

Conventionally, a longitudinal position has been estimated under the supposition that a vehicle constantly maintains the velocity at a moment when GPS reception is cut. In this method, however, when the vehicle is caught in a traffic congestion inside a tunnel, an error occurs in the position estimation. According to another method, an inertia sensor, an acceleration sensor, a gyro-sensor or the like may be used to correct a displacement. In this case, since the measured displacement is an absolute displacement, it is difficult to measure the relation with a line on the road map.

In the present embodiment, image recognition information is used to estimate a longitudinal position. The longitudinal position estimation unit 140 calculates a head angle between the line and the traveling direction of the vehicle through image recognition of a previous page at a moment when GPS reception is cut. Then, the longitudinal position estimation unit 140 acquires vehicle velocity information from an ECU or velocity sensor of the vehicle. A traveling distance in the line direction during a measurement period may be obtained through the following equation. At this time, the movement direction coincides with a normal direction of the line on the road map. Thus, the movement direction in a curved place changes at each moment.

$$LP = \Delta t \times v \times \cos\theta \quad \text{[Equation 3]}$$

Here, LP represents a longitudinal position of the vehicle, $\Delta t$ represents a time variation, v represents the velocity of the vehicle, and $\theta$ represents the head angle between the line and the traveling direction of the vehicle.

When the values of Equation 3 are accumulated during a predetermined time (for example, a time from a moment when GPS reception is cut to a moment when the GPS reception is recovered), the distance which the vehicle has traveled in the line direction may be calculated. Then, the longitudinal position of the vehicle may be estimated.

The route change determination system and method using image recognition information according to the embodiment of the present invention may match line recognition information to line characteristic information and trace a line change to specify a traveling lane. Furthermore, the route change determination system and method may calculate an offset for a left line of the traveling lane from image recognition information so as to correct a lateral position, and calculate a head angle from the image recognition information so as to estimate a longitudinal position, thereby more precisely specifying the lateral position and the longitudinal position. Thus, it is possible to obtain high-precision position information required for an autonomous navigation system through a low-priced general GPS module, without using a high-precision GPS module such as a DPGS device.

While the present invention has been described with respect to the specific embodiments, it will be apparent to those skilled in the art that various changes and modifications may be made without departing from the spirit and scope of the invention as defined in the following claims.

The invention claimed is:

1. A GPS correction system using image recognition information, comprising:
   a GPS module;
   an image recognition device acquiring line recognition information of a traveling lane on which a vehicle is currently traveling using a line recognition function, the line recognition information including number, color and shape of lines on both sides of the traveling lane;

a road map hardware storage unit storing road map information including line characteristic information, the line characteristic information including number, color and shape of lines of traffic lanes; and an information processing device recognizing a current position of the vehicle, by comparing the line recognition information acquired through the image recognition device with the road map information, the information processing device including an information matching unit recognizing the current position of the vehicle by matching the lines on both sides of the traveling lane acquired by the line recognition information, collectively, with sets of two adjoining lines stored in the road map information, each set of the two adjoining lines forming a traffic lane and being spaced apart by a traffic lane width, wherein when the lines on both sides of the traveling lane are matched in the number, color and shape with a unique one set of two adjoining lines stored in the road map information, the information matching unit recognizes the traffic lane corresponding to the unique one set of two lines as the current position of the vehicle, and a lane change tracing unit calculating the current position of the vehicle by using a former current position of the vehicle most recently recognized by the information matching unit and a lane change record of the vehicle from the image recognition device when the lines on both sides of the traveling lane, collectively, are matched in the number, color and shape with more than one set of two adjoining lines stored in the road map information;

wherein the information processing device further comprises a longitudinal position estimation unit configured to calculate a head angle between a line of the traveling lane and a traveling direction of the vehicle from the image recognition information and estimate a longitudinal position, when a signal received by the GPS module is lost.

2. The GPS correction system of claim 1, wherein the information processing device further comprises a lateral position correction unit configured to calculate an offset for a left line of the traveling lane from the image recognition information and correct a lateral position.

3. The GPS correction system of claim 2, wherein the lateral position correction unit adds the offset and the sum of widths of the traffic lanes on the left side of the vehicle, included in the line characteristic information, in order to correct the lateral position.

4. The GPS correction system of claim 1, wherein the longitudinal position estimation unit estimates the longitudinal position through the following equation:

$$LP = \Delta t \times v \times \cos\theta$$

where LP represents the longitudinal position of the vehicle, $\Delta t$ represents a time variation, v represents a velocity of the vehicle, and $\theta$ represents the head angle between the line of the traveling lane and the traveling direction of the vehicle.

5. The GPS correction system of claim 1, further comprising a road map receiving unit configured to receive the road map information from an external device.

6. A vehicle position recognition method using image recognition information, comprising:

(a) storing road map information including line characteristic information in a road map hardware storage unit, the line characteristic information including number, color and shape of lines of traffic lanes;

(b) acquiring line recognition information of a traveling lane on which a vehicle is currently traveling, by an image recognition device, the line recognition information including number, color and shape of lines on both sides of the traveling lane;

(c) recognizing a current position of the vehicle, in an information matching unit, by matching the line recognition information with the road map information, including matching the lines on both sides of the traveling lane acquired by line recognition information, collectively, with sets of two adjoining lines stored in the road map information, each set of the two adjoining lines forming a traffic lane and being spaced apart by a traffic lane width, and when the lines on both sides of the traveling lane are matched in the number, color and shape with a unique one set of two adjoining lines stored in the road map information, recognizing the traffic lane corresponding to the unique one set of two lines as the current position of the vehicle;

(d) when the lines on both sides of the traveling lane, collectively, are matched in the number, color and shape with more than one set of two adjoining lines stored in the road map information, calculating, in a lane change tracing unit, the current position of the vehicle by using a former current position of the vehicle most recently recognized by the information matching unit and a lane change record of the vehicle from the image recognition device;

(e) correcting a lateral position by calculating an offset for a left line of the traveling lane currently traveling using the image recognition information acquired through the image recognition device; and (f) estimating a longitudinal position by calculating a head angle between a line of the traveling lane and a traveling direction of the vehicle using the image recognition information, when a signal received by a GPS module is lost.

7. The GPS correction method of claim 6, wherein the step (e) comprises correcting the lateral position by adding the offset and the sum of widths of the traffic lanes on the left side of the vehicle included in the line characteristic information.

8. The GPS correction method of claim 7, wherein the step (f) comprises estimating the longitudinal position through the following equation:

$$LP = \Delta t \times v \times \cos\theta$$

where LP represents the longitudinal position of the vehicle, $\Delta t$ represents a time variation, v represents a velocity of the vehicle, and $\theta$ represents the head angle between the line of the traveling lane and the traveling direction of the vehicle.

9. The GPS correction method of claim 6, wherein the step (f) comprises estimating the longitudinal position through the following equation:

$$LP = \Delta t \times v \times \cos\theta$$

where LP represents the longitudinal position of the vehicle, $\Delta t$ represents a time variation, v represents a velocity of the vehicle, and $\theta$ represents the head angle between the line of the traveling lane and the traveling direction of the vehicle.

* * * * *